Patented Aug. 21, 1928.

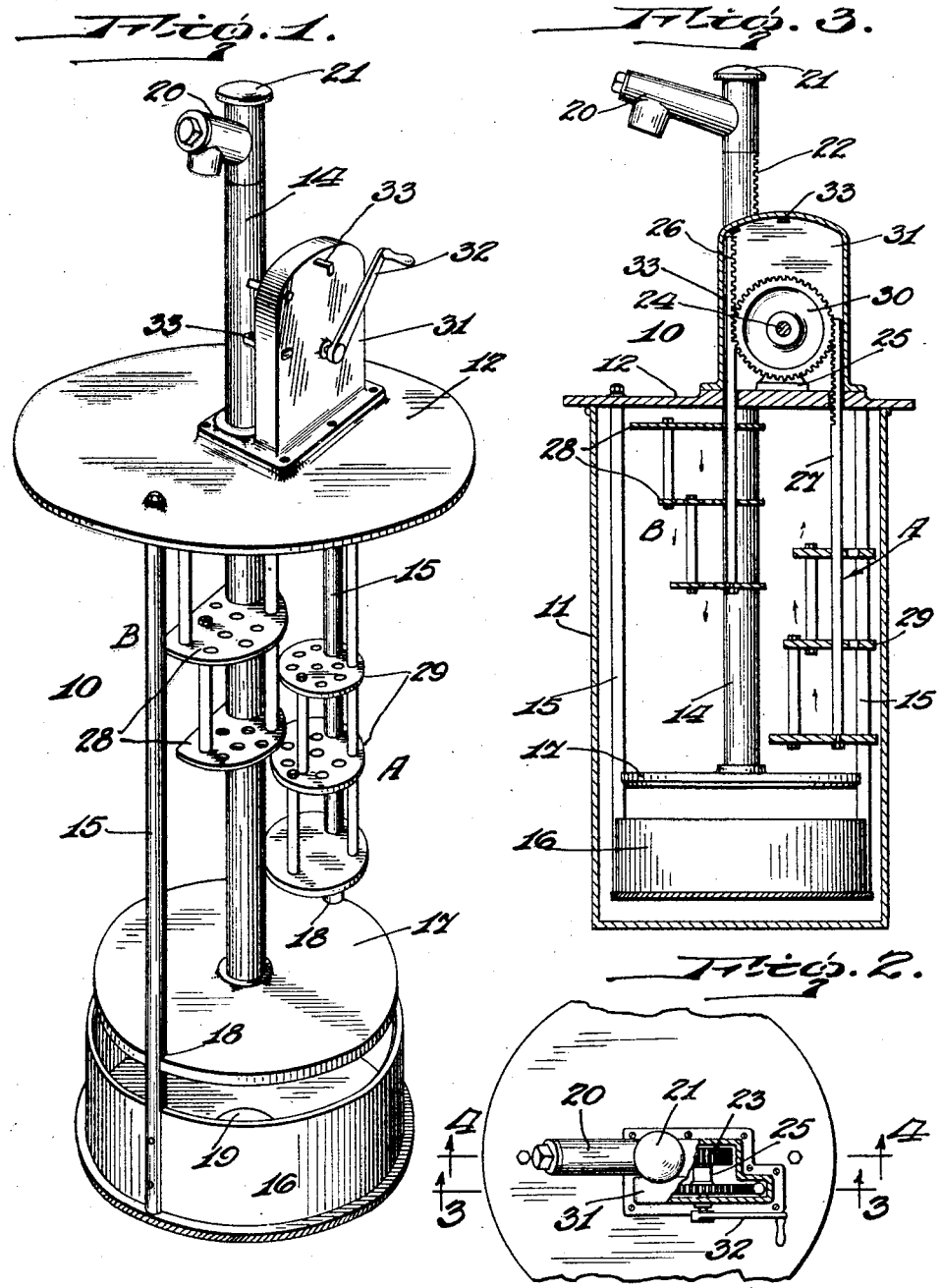

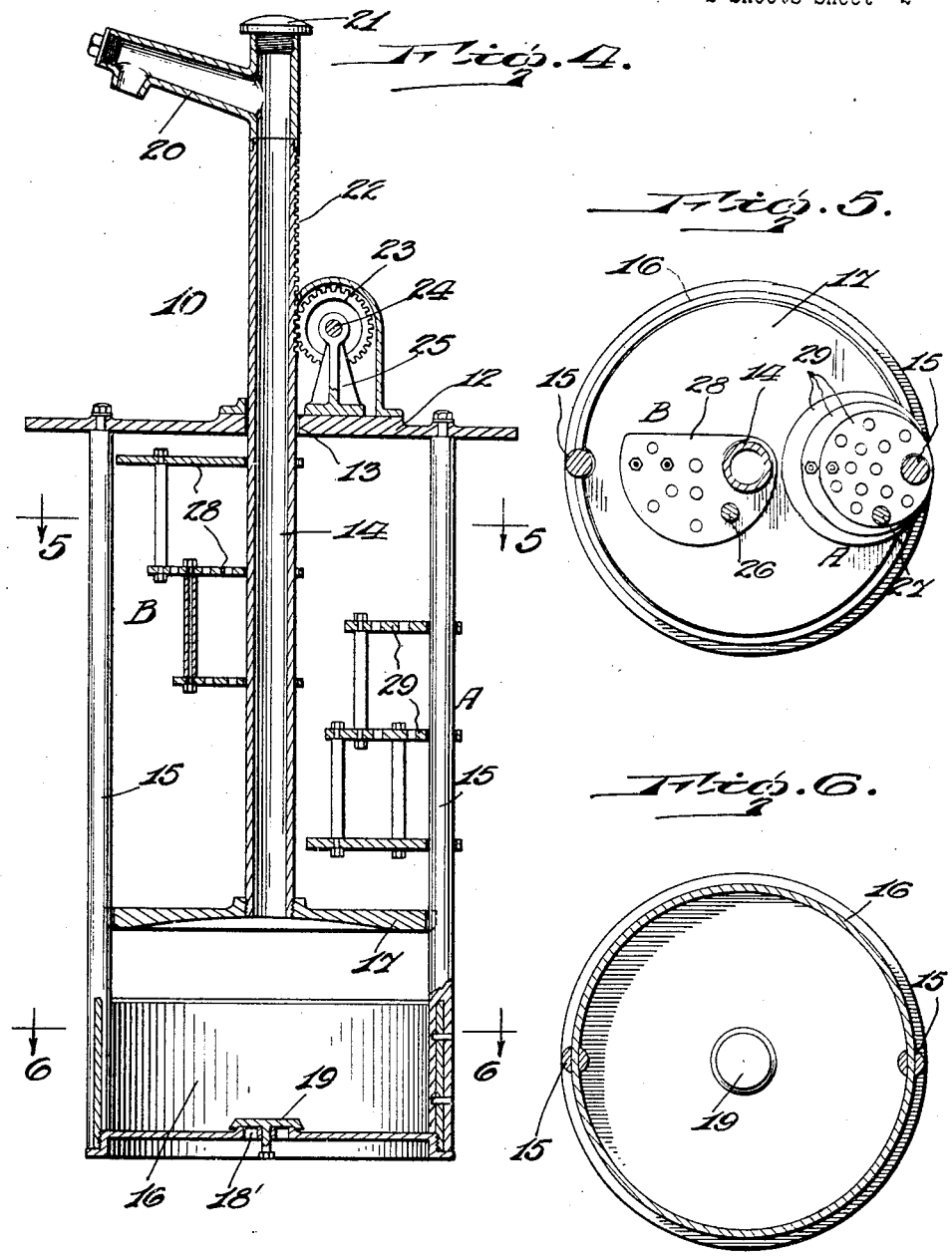

1,681,866

UNITED STATES PATENT OFFICE.

FRANCIS P. McCAULEY, OF WESTBURY, NEW YORK.

DISPENSING PUMP.

Application filed October 14, 1927. Serial No. 226,118.

This invention relates to dispensing pumps and is an improvement over my invention shown and described in my co-pending application filed June 25, 1926, Ser. No. 118,558. The primary object of the invention resides in a liquid pump for mixing the contents of a receptacle to which the pump is applied, measuring the amount of liquid to be dispensed, and dispensing the liquid, all in a single operation of the pump.

Another object of the invention is to provide a pump for use in dispensing any liquid containing two or more substances which require thorough mixing before it is dispensed in order that the full quality and flavor may be assured, the same being especially adapted for use in the dispensing of milk wherein a proportionate amount of fat and solid is required during each dispensing operation.

A further object is the provision of a dispensing pump which may be applied to a container as a single unit and removed therefrom when desired for cleaning purposes, whereby the parts may be kept in a sanitary condition at all times.

A still further object is to provide a dispensing pump which is springless in construction and which is normally held in a position for instant operation and which automatically returns to such position after each dispensing operation.

With these and further objects in view, the invention resides in certain novel construction and combination of parts, the essential features of which are hereinafter fully described, are particularly pointed out in the appended claims, and are illustrated in the accompanying drawings in which:—

Figure 1 is a perspective view of my improved pump per se.

Figure 2 is a top plan view of the same.

Figure 3 is a vertical sectional view on the line 3—3 of Figure 2.

Figure 4 is a similar view on the line 4—4 of Figure 2.

Figure 5 is a horizontal sectional view on the line 5—5 of Figure 4.

Figure 6 is a similar view on the line 6—6 of Figure 4.

Referring to the drawings by reference characters, the numeral 10 designates my improved pump in its entirety which constitutes a unit for use upon a receptacle or the like 11. The pump unit 10 includes a plate or disc 12 having a central opening 13 therein for slidably receiving a tubular plunger rod 14. When in position upon the receptacle 11, the plate 12 serves as a cover therefor as clearly shown in Figure 3 of the drawings. Depending downward from the plate 12 and disposed on opposite sides of the plunger rod 14 are guide rods 15 which have their lower ends bifurcated for fitting over the side walls of a cylinder 16. The cylinder 16 is riveted to the guide rods and has an internal diameter equal to the diameter of a plunger head 17 threaded to the lower end of the tubular plunger rod 14. The head 17 is slidably mounted on the guide rods 15 by providing notches 18 in the peripheral edge of the same to receive the rods and by which accidental rotation of the plunger head is prevented during reciprocation thereof. When the unit is in position upon a can the cylinder 16 is suspended just above the can bottom while the bottom of the cylinder is provided with an opening 18' through which liquid passes to the cylinder when the level of the liquid in the can drops below the top of the cylinder. The opening 18' is normally closed by a captive gravity valve 19 which automatically opens during the upward movement of the plunger head within the cylinder but is forced closed by the pressure set up by the plunger head during its down stroke into the cylinder to cause the contents of the cylinder to pass up through tubular plunger rod 14 and out through the discharge spout 20 extending outwardly from adjacent the top of the plunger rod. The extreme top end of the plunger rod is closed by a manipulating head 21 which is manually pressed to depress the plunger rod during the actuation of the pump under certain conditions.

The outer side wall of the tubular plunger rod has a series of rack teeth 22 thereon for meshing engagement with a gear 23 fixed to a shaft 24 journalled for rotation in bearings 25 mounted on a plate 12. Rack bars 26 and 27 are slidably mounted in the plate 12 and extend on opposite sides of the plate, the lower ends of the rack bars being provided with spaced perforated mixing discs 28 and 29 respectively. The discs 28 are slidable on the tubular plunger rod 14 which acts as a guide therefor while the discs 29 are slidable on one of the guide rods 15. The discs 28 gradually diminish in diameter from the uppermost one toward the lowermost one while the discs 29 are arranged in an opposite manner, that is, they increase in diameter from the top disc toward the lower disc. The rack bar 27 and its discs 29 constitute a mixer A and are made of a much heavier material than the rack bar 26 and its discs 28 which constitutes a mixer B so as to over-balance the mixer A for normally holding the two mixers at different horizontal planes. The mixer A is normally disposed below the mixer B as shown in Figure 3 of the drawings. The two rack bars 26 and 27 engage opposite sides of a gear 30 fixed to the shaft 24 and which gear is slightly larger in diameter than the gear 23 to impart movement to the mixers simultaneously in opposite directions with respect to each other and at a faster rate of speed than the plunger head, so as to cause a mixing of the liquid prior to the entrance of the plunger head 17 into cylinder 16. From the description thus far, it will be seen that to dispense any quantity of the contents of the receptacle, the operator may press downward upon the manipulating head 21 of the plunger rod and in so doing, causes the rack 22 to rotate the gear 23. As the gear 23 is fixed to the shaft 24, the same will rotate thus imparting rotation to the gear 30 which actuates the racks 26 and 27 in opposite directions. This action moves the mixers A and B in opposite directions causing a downward pushing action and an upward suction and a thorough mixing of the liquid substances and which fills the cylinder 16 and as the plunger head 17 moves downward into the cylinder, the contents thereof is forced upward through the tubular plunger rod 14 and out through the spout 20. By releasing the pressure on the plunger rod the weight of the mixer A and its rack bar overbalances the mixer B and returns the plunger and mixers to their original positions.

The gears and racks are enclosed within a suitable housing 31 and for dispensing a predetermined amount of liquid during each actuation, I provide a crank handle 32 on one end of the shaft 24. Suitable spaced stops 33 are slidably mounted in the housing 31 and may be selectively moved out into the path of the crank handle 32 to limit turning movement of the same. For example, should it be desired to dispense a glass of liquid, the first stop is moved out into the path of movement of the handle for engagement thereby which limits movement of the plunger head into the cylinder, thus causing the dispensing of but a small quantity of liquid. Any one of the stops may be moved to an obstructive position depending upon the amount of liquid to be dispensed, or they may all be moved out of the path of the handle to allow a full revolution of the same or a full depression upon the plunger rod 14.

From the foregoing description, it will be seen that I have provided a pump in which the contents of a receptacle is thoroughly mixed twice on each actuation of the pump, namely, before and after each dispensing operation.

What is claimed as new is:—

1. In a dispensing pump, a cylinder, a reciprocable plunger movable into said cylinder and having a tubular plunger rod, reciprocable mixing elements, and means for actuating said mixing elements in opposite directions with respect to each other and for simultaneously imparting reciprocation to said plunger.

2. In a dispensing pump, a cylinder, a reciprocable plunger movable into said cylinder and having a tubular plunger rod, reciprocable mixing elements, and means for actuating said mixing elements in opposite directions with respect to each other and for simultaneously imparting reciprocation to said plunger for movement in the same direction with one of said mixing elements but at a slower speed with respect thereto.

3. In a dispensing pump, a cylinder, a reciprocable plunger movable into said cylinder and having a tubular plunger rod provided with a discharge outlet, reciprocable mixing elements, actuating means for reciprocating said mixing elements simultaneously in opposite directions with respect to each other, and means for simultaneously reciprocating said plunger with said mixing elements but at a slower rate of speed with respect thereto.

4. In a dispensing pump, a cylinder, a reciprocable plunger movable into said cylinder and having a tubular plunger rod provided with a discharge outlet, reciprocable mixing elements, actuating means for reciprocating said mixing elements simultaneously in opposite directions with respect to each other, and means for simultaneously reciprocating said plunger with said mixing elements but at a slower rate of speed with respect thereto, and means for regulating the reciprocation of said plunger and mixing elements in their movement in one direction.

5. In a dispensing pump, a cylinder, a reciprocable plunger movable into said cylinder and having a tubular plunger rod provided with a discharge outlet, reciprocable mixing elements, actuating means for reciprocating said mixing elements simultaneously in opposite directions with respect to each other, and means for simultaneously reciprocating said plunger with said mixing elements but at a slower rate of speed with respect thereto, and means for regulating the reciprocation of said plunger and mixing elements in their movement in one direction, said last means including a rotatable manipulating handle, and slidable stops selectively movable into the path of movement of said handle.

6. In a dispensing pump, a cylinder, a reciprocable plunger having a tubular plunger rod, provided with a discharge outlet, a series of rack teeth provided on said plunger rod, a rotatable shaft journalled adjacent said plunger rod, a manipulating handle fixed to said shaft, and a gear fixed to said shaft and meshing with the rack teeth on said plunger rod, a second gear fixed to said shaft, a pair of reciprocable mixing elements including rack bars meshing respectively with opposite sides of said second gear.

7. In a dispensing pump, a cylinder, a reciprocable plunger having a tubular plunger rod provided with a discharge outlet, a series of rack teeth provided on said plunger rod, a rotatable shaft journalled adjacent said plunger rod, a manipulating handle fixed to said shaft and a gear fixed to said shaft and meshing with the rack teeth on said plunger rod, a second gear fixed to said shaft, a pair of reciprocable mixing elements including rack bars meshing respectively with opposite sides of said second gear, the weight of one of said mixing elements being greater than the weight of the other mixing element to over-balance the same to normally hold said mixing elements on different horizontal planes.

8. In a dispensing pump for use in connection with a container, a plate, a pair of spaced guide rails suspended from said plate, a cylinder carried by said side rails, a plunger head slidably mounted on said guide rails, a tubular plunger rod connected to said plunger head and slidably mounted in said plate, and provided with an outlet, a series of gear teeth provided on said tubular plunger rod, a shaft journalled above said plate, a handle on said shaft for imparting turning movement thereto, and a gear fixed to said shaft and meshing with the rack teeth on said tubular plunger rod.

9. In a dispensing pump for use in connection with a container, a plate, a pair of spaced guide rails suspended from said plate, a cylinder carried by said side rails, a plunger head slidably mounted on said guide rails, a tubular plunger rod connected to said plunger head and slidably mounted in said plate and provided with an outlet, a series of gear teeth provided on said tubular plunger rod, a shaft journalled above said plate, a handle on said shaft for imparting turning movement thereto, and a gear fixed to said shaft and meshing with the rack teeth on said tubular plunger rod, and selective obstructing elements movable into the path of said handle for limiting turning movement thereof.

10. In a liquid dispensing pump, a pair of reciprocable mixing elements, each of said mixing elements including a plurality of spaced discs of varying diameter, the disks of the respective mixing elements being out of the path of movement of each other to allow the same to pass during reciprocation and means for imparting simultaneous movement to said mixing elements in opposite directions.

In testimony whereof I have affixed my signature.

FRANCIS P. McCAULEY.